No. 622,913. Patented Apr. 11, 1899.
A. M. CUSHING.
BICYCLE SEAT.
(Application filed Mar. 1, 1897.)
(No Model.)
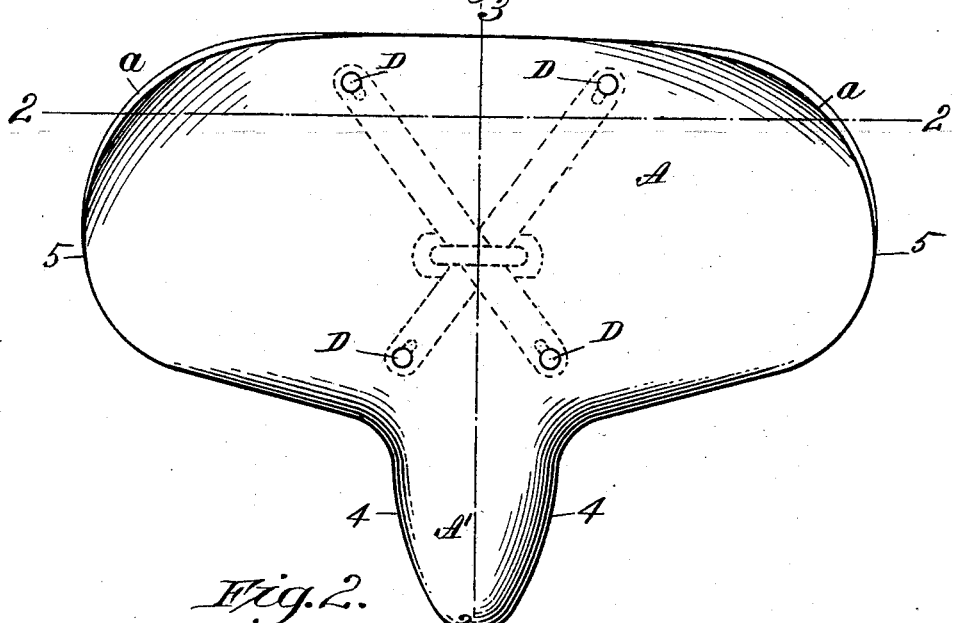
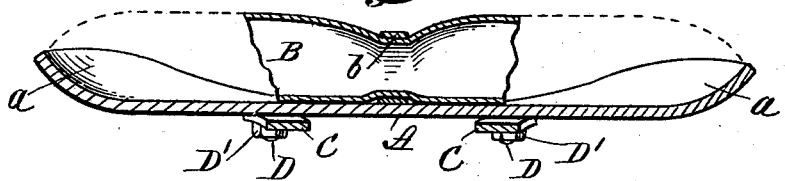
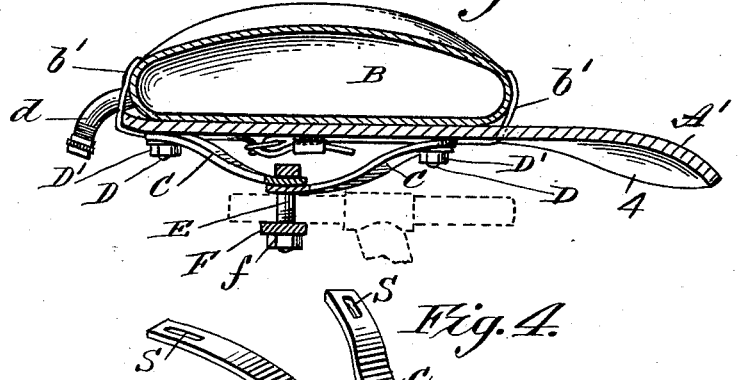
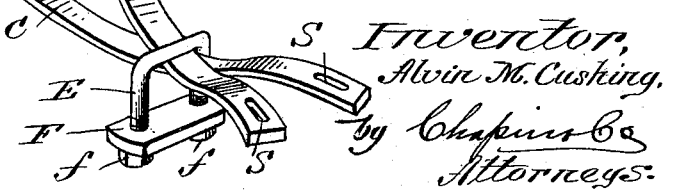
Witnesses:
J. A. Garfield
K. J. Clemons
Inventor,
Alvin M. Cushing,
by Chapin & Co
Attorneys.
THE NORRIS PETERS CO., PHOTO-LITHO., WASHINGTON, D. C.

Fishing# UNITED STATES PATENT OFFICE.

ALVIN M. CUSHING, OF SPRINGFIELD, MASSACHUSETTS.

BICYCLE-SEAT.

SPECIFICATION forming part of Letters Patent No. 622,913, dated April 11, 1899.

Application filed March 1, 1897. Serial No. 625,484. (No model.)

*To all whom it may concern:*

Be it known that I, ALVIN M. CUSHING, a citizen of the United States of America, residing at Springfield, in the county of Hampden and State of Massachusetts, have invented new and useful Improvements in Bicycle-Seats, of which the following is a specification.

This invention relates to seats for bicycles, and has for its object the construction of a seat having a cushioned rigid base hung on supports adapted to yield to the movements of the rider; and the invention consists in the construction of a seat as shown and described in the accompanying drawings and specification and pointed out in the claim.

In the drawings forming part of this specification, Figure 1 is a plan view of a seat embodying my improvements having the cushion removed therefrom. Fig. 2 is a cross-section of the seat substantially on line 2 2, Fig. 1, and showing a part of a cushion thereon, also in section. Fig. 3 is a longitudinal section substantially on line 3 3, Fig. 1, and showing, also in section, a cushion secured thereon.
Fig. 4 is a perspective view of the spring-supports and a yoke adapted to secure the seat to the seat-bar of a bicycle.

Referring to the drawings, A is the seat of the bicycle, which is preferably made of wood of several thicknesses of veneer glued up cross-grained, which impart strength and lightness thereto. Said seat is constructed with the upwardly-turned edges *a a* to the right and left of the pommel A', the upward curves of which begin at the sides of the seat and extend well around toward the back thereof, where the curves dip again to the surface of the seat. This feature is shown in Figs. 1 and 2. The seat is also provided with a pommel A' common to most seats for bicycles, which has a rounded upper surface, the two edges 4 4 and the point dipping downwardly, thus producing a rounded edge extending back from the point and following the contour of the seat, around the front edge thereof, nearly to the points 5 5, where the upward curve of the edges *a a* begins.

A bicycle-seat constructed with a broad seat and downwardly-curved front edges and having upturned flanges or edges *a a* extending partly around the back thereof makes a comfortable seat and one which so fits the rider as to afford, by means of said edges or flanges *a a*, abutments against which the rider can apply considerable weight in pedaling.

The seat is given its desired shape between dies in the well-known manner.

This seat can be used without the cushion B, if desired. This cushion is fitted and removably secured to the seat A, and consists of a bag, made of rubber or other suitable material, for holding air under pressure, or said bag may be filled, or partially so, with water. A cross-section of the cushion B is shown in Fig. 3 and a longitudinal section in Fig. 2. Said cushion, as shown in said Fig. 2, is divided transversely in line substantially with the pommel of the saddle by a nonelastic seam or band *b*, whereby when the cushion is inflated with air or other fluid (a valve *d* being provided for that purpose) said central portion occupied by the band *b* will remain below the level of the surface of the cushion, each side thereof. To attach the cushion to the seat, straps *b'* are secured to opposite ends of the cushion, and these straps are passed down under the seat A and buckled. To enable the straps secured to the front end of the cushion to pass under the seat, openings are made through it for the passage of the straps, as shown in Fig. 3.

The support for the seat A consists of two springs C C, the ends of which are movably attached to the under side of the seat by the bolts D passing through the seat and through slots *s* in the ends of said springs, a nut on the ends of the bolts securing the parts in place. The said springs C C are applied to the seat diagonally, as shown in Fig. 1 in dotted lines, and said springs cross each other and at a point of their intersection pass through a yoke E. A bar F receives the ends of said yoke, which is placed on the seat-bar, (indicated in dotted lines in Fig. 3,) and the nuts *f f* on the ends of the said yoke under the said bar F serve to secure the latter rigidly to the said seat-bar, at the same time clamping the springs C C. The seat is thus rigidly secured to the bicycle.

The placing of springs C C diagonally under the seat A is for the purpose of bringing each spring as nearly as possible in line with the dip of the seat consequent upon the act of pedaling—that is to say, the downthrust of the right foot will cause the forward right-hand edge of the seat to dip downward, deflecting the spring extending from the said right-hand edge back across the seat diagonally in line with said downward movement, the other spring, located at an angle nearly transverse to the line of movement, remaining practically inactive except some slight torsional strain it may be subjected to. The same action of course takes place when the left foot is moved, the result being an easy yielding of the seat to the motions of the body.

The slots $s$ in the ends of the springs are of obvious necessity to permit a certain amount of movement between the parts.

Having thus described my invention, what I claim, and desire to secure by Letters Patent, is—

In a bicycle saddle or seat, the combination with the base, of two springs crossed at their central portions, and having their ends secured to the base so as to have a limited sliding connection therewith, and a clamp device uniting the crossed springs at their centers and serving to secure the seat to the bicycle-frame, substantially as described.

ALVIN M. CUSHING.

Witnesses:
H. A. CHAPIN,
K. I. CLEMONS.